(12) United States Patent
Sekiguchi et al.

(10) Patent No.: US 7,812,905 B2
(45) Date of Patent: Oct. 12, 2010

(54) LIQUID CRYSTAL DISPLAY DEVICE AND MANUFACTURING METHOD THEREOF

(75) Inventors: Shinji Sekiguchi, Kawasaki (JP); Keiji Takanosu, Yokohama (JP); Yasushi Sano, Yokohama (JP); Koji Hara, Yokohama (JP); Hiroyasu Matsuura, Yokohama (JP)

(73) Assignee: Hitachi Displays, Ltd., Chiba (JP)

( * ) Notice: Subject to any disclaimer, the term of this patent is extended or adjusted under 35 U.S.C. 154(b) by 271 days.

(21) Appl. No.: 11/845,806

(22) Filed: Aug. 28, 2007

(65) Prior Publication Data
US 2008/0074588 A1    Mar. 27, 2008

(30) Foreign Application Priority Data
Sep. 22, 2006    (JP)    ............................. 2006-257286

(51) Int. Cl.
*G02F 1/1335*    (2006.01)
(52) U.S. Cl. ....................... 349/114; 349/141; 349/117; 349/118; 349/119
(58) Field of Classification Search ................ 349/114, 349/141, 117–119, 187
See application file for complete search history.

(56) References Cited

U.S. PATENT DOCUMENTS

| | | | |
|---|---|---|---|
| 7,088,409 B2 * | 8/2006 | Itou et al. | 349/114 |
| 7,535,530 B2 * | 5/2009 | Teramoto et al. | 349/117 |
| 7,675,592 B2 * | 3/2010 | Ochiai et al. | 349/114 |
| 7,692,745 B2 * | 4/2010 | Igeta et al. | 349/114 |
| 2005/0264731 A1 | 12/2005 | Itou et al. | |
| 2006/0125984 A1 * | 6/2006 | Park et al. | 349/114 |
| 2006/0187388 A1 * | 8/2006 | Ohyama et al. | 349/114 |

FOREIGN PATENT DOCUMENTS

JP    2005-338256    12/2005

* cited by examiner

*Primary Examiner*—David Nelms
*Assistant Examiner*—Thanh-Nhan P Nguyen
(74) *Attorney, Agent, or Firm*—Antonelli, Terry, Stout & Kraus, LLP.

(57) ABSTRACT

The present invention relates to a method of manufacturing a transflective liquid crystal display device including a color filter substrate having a plurality of pixels, each including a reflective display part and a transmissive display part, and retardation plates each built in areas on a principal surface of the color filter substrate opposed to a liquid crystal layer, which correspond to the reflective display parts. The manufacturing method is characterized by including in the following order: a first step of applying a photosetting resin composition on the principal surface of the color filter; a second step of partially curing areas of a photosetting resin film, which correspond to the reflective display parts, respectively, by light exposure through a mask; a third step of removing uncured portions of the photosetting resin film remaining in the second step by development; a fourth step of selectively forming unevenness in areas of a principal surface of the cured photosetting resin film, which correspond to the reflective display parts; and a fifth step of applying a material of the retardation plate onto the photosetting resin film having the unevenness, to form the retardation plates in the respective areas corresponding to the reflective display parts, by anchoring energy of a part having the unevenness, for the material of the retardation plate.

4 Claims, 5 Drawing Sheets

LIQUID CRYSTAL DISPLAY DEVICE AND MANUFACTURING METHOD THEREOF

The present application claims priority from Japanese application JP 2006-257286 filed on Sep. 22, 2006, the content of which is hereby incorporated by reference into this application.

BACKGROUND OF THE INVENTION

The present invention relates to a liquid crystal display device, in particular, a transflective liquid crystal display device and a manufacturing method thereof.

Japanese Patent Laid-Open Publication No. 2005-338256 (corresponding to US 2005/0264731 A1; hereinafter, referred to as Patent Document 1) describes a transflective in-plane switching (IPS) liquid crystal display device which applies a lateral electric field to a liquid crystal layer. Not only the transflective liquid crystal display device which employs the IPS system but also the device which employs, for example, a twisted nematic (TN) system or a vertical alignment (VA) system, includes a transmissive display part and a reflective display part in one pixel. The reflective display part of the transflective liquid crystal display device exemplified in Patent Document 1 includes an embedded retardation plate whose retardation is equal to a half wavelength. Further, retardation of a liquid crystal layer in the reflective display part is adjusted to a quarter wavelength in the transflective liquid crystal display device to enable a reflective display under a wide range of environments including well-lit places and dark places, as well as transmissive display of high quality at a wide viewing angle. The embedded retardation plate is formed of molecules exhibiting a birefringence such as liquid crystal molecules.

Such a liquid crystal display device has the following structure. On a color filter-side substrate, RGB resist layers, a leveling layer for planarizing the RGB resist layers, an alignment film for aligning molecules of an embedded retardation plate, the embedded retardation plate formed of molecules aligned by the alignment film, and an alignment film for aligning molecules in the liquid crystal layer are deposited in this order.

Therefore, a manufacturing process of the liquid crystal display device requires a step of applying and baking, for example, a polyimide-based organic material, and then performing an alignment process on the baked polyimide-based organic material by a rubbing method to form the alignment film for aligning the molecules in the embedded retardation plate.

SUMMARY OF THE INVENTION

For mass production of the transflective liquid crystal display devices (in particular, IPS liquid crystal display panels), the reduction in cost as well as in manufacturing time is desired so as to reduce the number of steps in the manufacturing process.

The present invention has an object of reducing the number of steps in a manufacturing process for a transflective liquid crystal display device.

In order to achieve the above object, a part of a leveling layer which planarizes colored resist layers, in which a retardation plate is built, is provided with anchoring energy in the present invention. The part of the leveling layer is made to serve as an underlayer of the retardation plate, whereby a step of forming an alignment film is omitted.

According to a first aspect of the present invention, a method of manufacturing a transflective liquid crystal display device including a retardation plate built therein, includes: a step of applying a photosetting resin composition serving as an underlayer of the retardation plate; a step of selectively forming unevenness on a part of the applied photosetting resin composition, in which the retardation plate is provided, by a partial curing process by light exposure through a mask, and a development process which removes an uncured portion; and a step of applying material of the retardation plate to form the retardation plate by anchoring energy of the part on which the unevenness is formed.

According to a second aspect of the present invention, a method of manufacturing a transflective liquid crystal display device including a retardation plate built in a reflective display part of a color filter substrate, includes: a step of applying a photosetting resin composition as a leveling layer of colored resist layers on the color filter substrate; a leveling layer curing step of partially exposing the photosetting resin composition to light to cure the photosetting resin composition; a development step of removing an uncured portion of the photosetting resin composition; a step of applying material of the retardation plate on a layer made of the photosetting resin composition; a heating step of heating the applied material of the retardation plate; and a retardation plate curing step of exposing the material of the retardation plate to light to cure the material of the retardation plate. In the leveling layer curing step, the photosetting resin composition is exposed to light through a mask to alternately arrange exposed areas and unexposed area of the photosetting resin composition in the area where the retardation plate is provided.

Moreover, according to a third aspect of the present invention, a transflective liquid crystal display device including a reflective display part and a transmission display part, includes a resin layer formed over the reflective display part and the transmissive display part to be in contact with a leveling layer which planarizes colored resist layer on a substrate on a color filter side. The resin layer has a phase difference property in the reflective display part.

DESCRIPTION OF THE PREFERRED EMBODIMENTS

Hereinafter, a liquid crystal display device, to which an embodiment of the present invention is applied, will be described.

Figure 1:
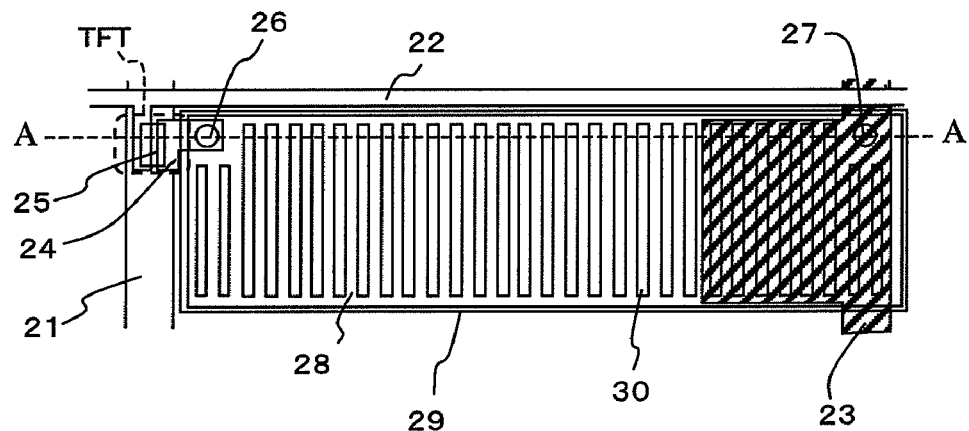
FIG. 1 is a top view of one pixel of a liquid crystal display device.
Figure 2:
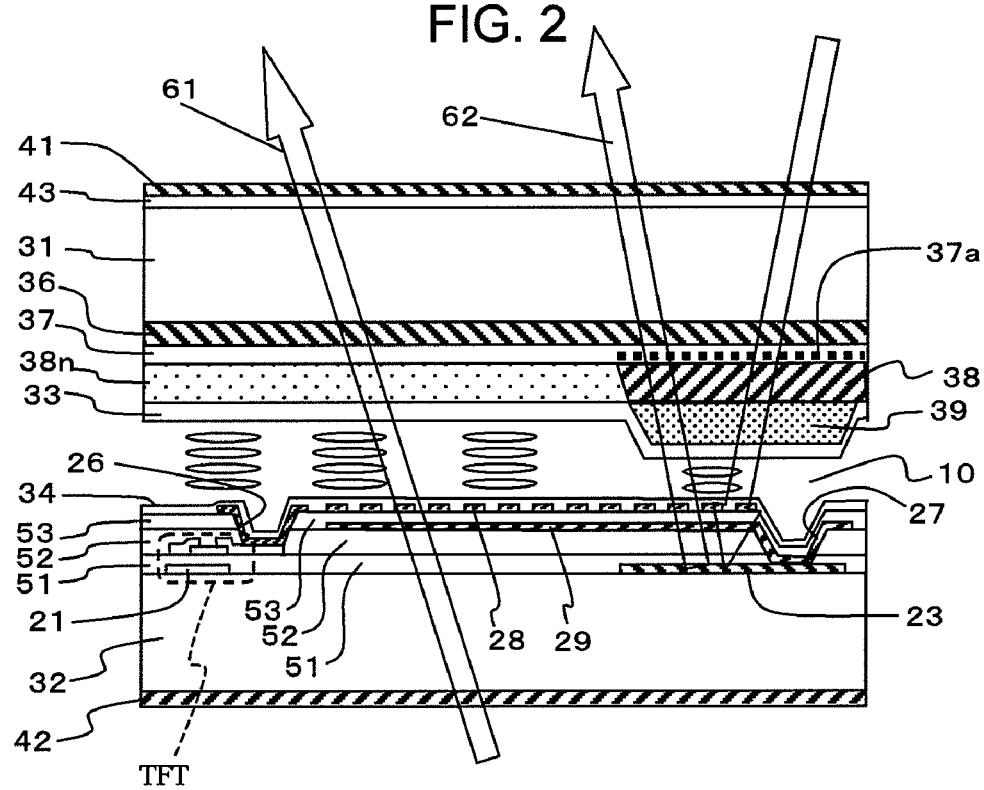
FIG. 2 is a sectional view cut along a direction A-A in FIG. 1.

FIG. 1 is a top view of one pixel constituting a liquid crystal display device according to this embodiment. FIG. 2 is a sectional view cut along a direction A-A in FIG. 1. A part indicated by reflected light 62 is a reflective display part, whereas the remaining part indicated by transmitted light 61 is a transmissive display part. In FIGS. 1 and 2, the liquid crystal display device according to the present invention is exemplified as an IPS transflective liquid crystal display device. Based on the gist of the present invention, however, the present invention is also applicable to a transflective liquid crystal display device employing a system other than the IPS system.

The liquid crystal display device mainly includes a first substrate 31, a second substrate 32, and a liquid crystal layer 10 sandwiched between the first substrate 31 and the second substrate 32.

The first substrate 31 includes, on the liquid crystal layer 10 side in its reflective display part, a color filter 36, a leveling layer 37, a built-in retardation plate 38, a step formation resist layer 39, and a first alignment film 33. The first substrate 31 also includes, on the liquid crystal layer 10 side in its transmissive display part, the color filter 36, the leveling layer 37, a residual layer 38n, and the first alignment film 33. Since the color filters 36 are formed on a principal surface of the first substrate 31, the first substrate 31 including the above-described structure formed on the principal surface (opposed to the liquid crystal layer 10) is also referred to as color filter substrate.

The first substrate 31 is made of borosilicate glass containing little ionic impurity and has a thickness of 0.5 mm.

The color filter 36 is formed of black matrix layers and red (R), green (G), and blue (B) colored resist layers which are repeatedly arranged in a striped manner. Each of the stripes is parallel to a signal wiring 22. Unevenness of the color filter 36 due to the colored resist layers are planarized by the leveling layer 37 made of a resin. On the plurality of colored resists constituting the color filters 36 and on the principal surface of the first substrate 31 on which the colored resists and a light-shielding layer which separates the colored resists from each other are formed, undulation is generated. The "planarizing of the color filters 36" described below means that the undulation of the upper surface of the leveling layer 37 is reduced to be smaller than that of the upper surfaces of the color filters 36 serving as an underlayer film, by covering the plurality of colored resists and the light-shielding layer with an insulating material made of a resin or the like, and does not exclude a process which leaves slight undulation on the upper surface of the insulating film (leveling layer) 37.

It is preferable that the leveling layer 37 be made of a transparent material. The leveling layer 37 has a thickness normally in the range of 0.5 to 3 µm with the objective of sufficiently planarizing the colored resist layers. A part 37a of the leveling layer 37, which is in contact with the built-in retardation plate 38, has a structure capable of aligning molecules in the built-in retardation plate 38 (hereinafter, also referred to as anchoring structure). Specifically, a plurality of grooves formed by minute unevenness are present on the part 37a. The anchoring structure is formed by, for example, arranging a plurality of linear grooves, each extending in a first direction, in parallel in a second direction intersecting the first direction, on the upper surface of the leveling layer 37 (principal surface on which the built-in retardation plate 38 is formed).

The built-in retardation plate 38 is obtained by curing a liquid crystal material having a birefringence. The liquid crystal molecules of the built-in retardation plate 38 are aligned by the anchoring structure of the leveling layer 37 in contact therewith.

The residual layer 38n is an area where the material applied over the entire surface of the leveling layer 37 to form the built-in retardation plate 38 in the manufacturing process is cured without having a phase difference property.

The step formation resist layer 39 is provided to form a retardation difference of a quarter wavelength between the reflective display part and the transmissive display part. The step formation resist layer 39 illustrated in FIG. 2 is formed on the principal surface of the first substrate 31 and propagates light, which comes from the outside of the liquid crystal display device to be incident on the first substrate 31, to the liquid crystal layer 10. However, the step formation resist layer 39 or an equivalent thereof is sometimes formed as an opaque layer on a principal surface of the second substrate 32.

The first alignment film 33 is a polyimide-based organic film and is subjected to an alignment process by a rubbing method to align the liquid crystal molecules of the adjacent liquid crystal layer 10 in the alignment process direction.

Another layer which planarizes the built-in retardation plate 38 and the residual layer 38n may be provided, for example, between the built-in retardation plate 38 and the residual layer 38n, and the first alignment film 33.

The second substrate 32 includes a thin film transistor (TFT) on the liquid crystal layer 10 side. The thin film transistor is connected to scanning wiring 21, the signal wiring 22, and a pixel electrode 28. The thin film transistor has an inversely-staggered structure and has a channel part formed of an amorphous silicon layer 25. The amorphous silicon layer 25 may be annealed with a laser to be turned into a channel section made of polycrystalline silicon or continuous grain silicon. At this time, it is preferred that the thin film transistor have a staggered structure, in which a control electrode (the scanning wiring 21 or a gate electrode) that applies an electric field to the channel section is provided over the channel section, rather than an inversely-staggered structure, in which the control electrode is provided below the channel section. Besides, the second substrate 32 includes common wiring 23 and a common electrode 29. The scanning wiring 21 and the signal wiring 22 intersect with each other. Although not illustrated in FIGS. 1 and 2, a plurality of the pixel electrodes 28 are two-dimensionally arranged on the principal surface (opposed to the liquid crystal layer 10) of the second substrate 32. A plurality of the scanning wirings 21, each extending in the first direction, are arranged in parallel in the second direction intersecting with the first direction. At the same time, a plurality of the signal wirings 22, each extending in the second direction, are arranged in parallel in the first direction. With such an arrangement, each of the pixel electrodes 28 and those adjacent thereto are separated from each other. Each of the thin film transistors is provided between a corresponding one of the plurality of signal wirings 22 and the pixel electrode 28, and is controlled by one of the plurality of scanning wirings 21. The thin film transistor is positioned at approximately the intersection of the scanning wiring 21 and the signal wiring 22. Since the thin film transistor TFT (structure in a dashed line frame) is formed on the principal surface (opposed to the liquid crystal layer 10) of the second substrate 32, the second substrate 32 including the above-described structure formed on its principal surface is also referred to as TFT substrate.

The common wiring 23 extends in the first direction as in the case of the scanning wiring 21, and has a structure of protruding into the pixel electrode 28 (toward the scanning wiring 21) in an area where the common wiring 23 intersects with the pixel electrode 28. As indicated by the reflected light 62 in FIG. 2, the common wiring 23 reflects light passing from the first substrate 31 through the liquid crystal layer 10 to the common wiring 23. In FIGS. 1 and 2, an area in which the common wiring 23 overlaps the pixel electrode 28 serves as the reflective display part. An area in which the pixel electrode 28 overlaps the common electrode 29 other than the reflective display part transmits light from a backlight as indicated by transmitted light 61 shown in FIG. 2, and serves as a transmissive display section. The common wiring 23 formed with the thin film transistor TFT on the second substrate 32 is specific to the IPS liquid crystal display device including the common electrode 29 formed on the second substrate 32. The reflective display part including such a structure is not found in a TN or VA transflective liquid crystal display device.

Since an optimal thickness of the liquid crystal layer in the transmissive display part differs from that in the reflective display part, a step may be provided at the boundary between the transmissive display part and the reflective display part. In order to reduce a length of the boundary between the transmissive display part and the reflective display part, the transmissive display part and the reflective display part are arranged so that the boundary is parallel to a shorter side of the pixel.

In this manner, if a reflector serves as the wirings such as the common wiring 23, the effects of reducing the manufacturing process for the reflector and the common wiring 23 can be obtained. The formation of the common wiring 23 of a metal having a high reflectivity such as aluminum or tantalum provides brighter reflective display. Even if the common wiring 23 is made of chromium and a reflector plate made of aluminum or a silver alloy is independently formed, the same effects can be obtained.

The liquid crystal layer 10 is a liquid crystal compound exhibiting positive dielectric constant anisotropy, which has a dielectric constant larger in the orientation direction than in a normal direction. The liquid crystal layer 10 has a birefringence of 0.067 at 25° C., and exhibits a nematic phase in a wide temperature range including a room temperature range. During a retention period in which the liquid crystal layer 10 is driven at a frequency of 60 Hz by using the thin film transistor, the liquid crystal layer 10 keeps sufficiently high reflectivity and transmittance to exhibit a high resistance without causing any flicker.

As described above, the built-in retardation plate 38 is formed on the leveling layer 37 in the reflective display part. Conventionally, an alignment film is formed on the leveling layer 37, and then the built-in retardation plate 38 is formed thereon. With this structure, the built-in retardation plate 38 made of molecules exhibiting a birefringence such as liquid crystal molecules is provided with an alignment property. On the other hand, in this embodiment, the formation of the alignment film is omitted to simplify the manufacturing process. The part 37a of the leveling layer 37, which is in contact with the built-in retardation plate 38, is provided with anchoring energy to directly form the built-in retardation plate 38 on the part 37a of the leveling layer 37. Specifically, in this embodiment, the leveling layer 37 not only plays its original role of planarizing the color filter 36 but also plays the role of aligning the molecules in the built-in retardation plate 38.

It is also conceivable to form a conventional alignment film to have a larger thickness to allow the thus formed alignment film to serve as the leveling layer. However, since material of the alignment film is not transparent, the transmittance is reduced if the thickness is increased for planarizing. Therefore, this method is not practical. If the alignment film which determines an initial orientation direction (for example, a direction of an optical axis of each of the liquid crystal molecules to which no electric field is applied) of each of the liquid crystal molecules forming the liquid crystal layer (area where a transmittance of the light is controlled by an electric field) of the liquid crystal display device is formed to have a large thickness, the following harmful effects are produced. One of the harmful effects is remarkable attenuation in intensity of light (for example, visible light in a wavelength band of 380 to 780 nm) transmitted through the alignment film. Specifically, a low transmittance of the alignment film can be negligible when the alignment film is formed thin. At the large thickness, however, the alignment film impairs an image display function of the liquid crystal display device. The other harmful effect is a stain of transmitted light. Specifically, the light transmitted through the alignment film takes on an undesirable color. Further, the alignment film has to provide movement on the liquid crystal molecules oriented in the initial direction to move their optical axes according to the electric field applied thereto. Therefore, a material itself of the alignment film is limited, resulting in high material cost.

On the other hand, the built-in retardation plate 38 according to the present invention is made of the molecules exhibiting a so-called birefringence such as, for example, liquid crystal molecules (liquid crystal polymers). The molecules are aligned by the leveling layer 37 to orient one of the plurality of optical axes of the molecules having different refractive indices (for example, an optical axis exhibiting a high refractive index) in a specific direction. However, the molecules forming the built-in retardation plate 38 are desired to be aligned in the specific direction regardless of the intensity of the electric field applied to the liquid crystal layer. Therefore, the molecules (optically anisotropic bodies) forming the built-in retardation plate 38 are aligned by the anchoring structure of the leveling layer 37 in the present invention.

Manufacturing Step of the Built-In Retardation Plate

A characteristic manufacturing process which forms the leveling layer 37 and the built-in retardation plate 38 will now be described.

Figure 3:
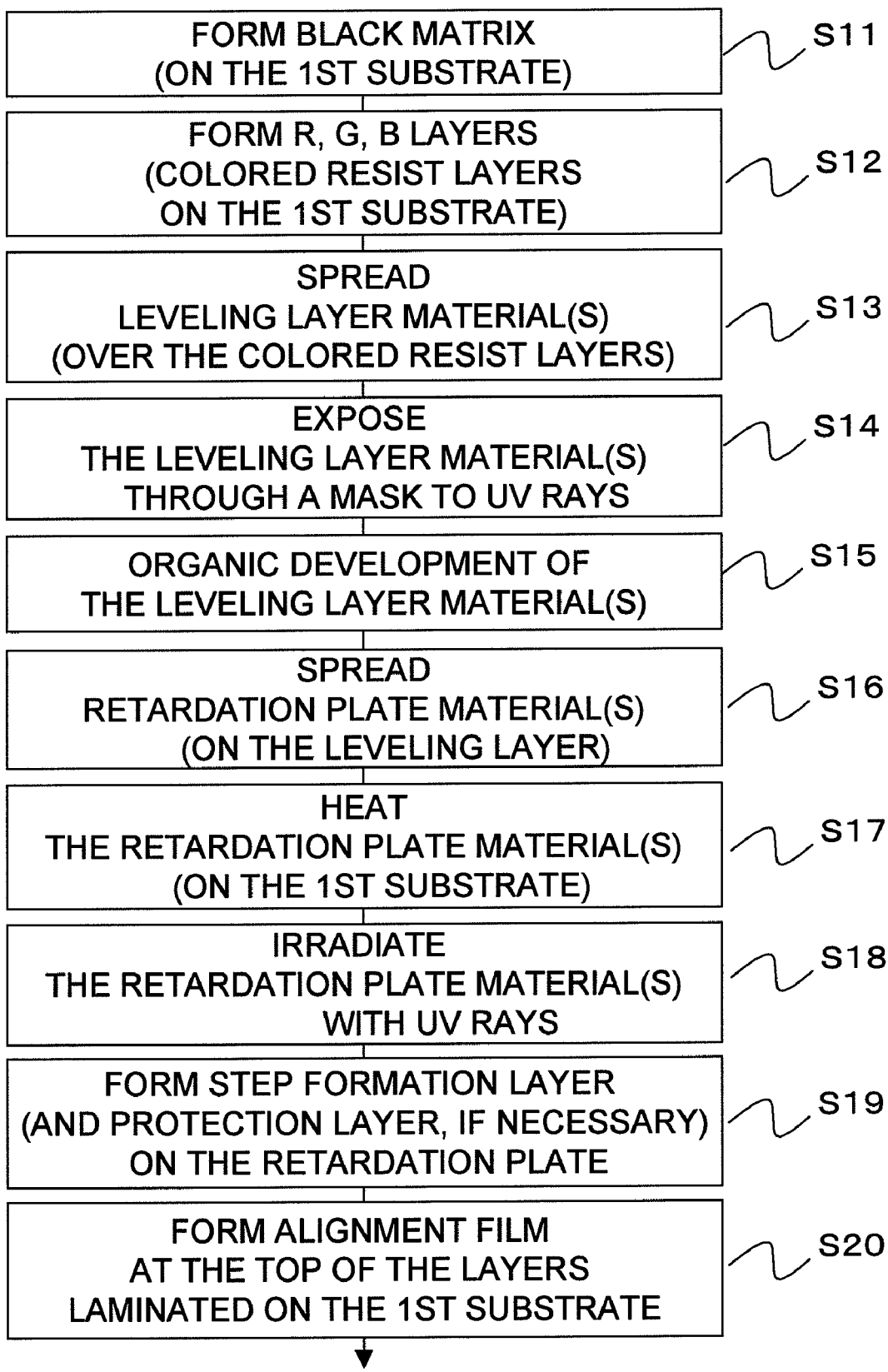
FIG. 3 is a diagram showing a part of a manufacturing process.

FIG. 3 illustrates a view showing a process from a step of forming the color filter 36 to a step of forming the first alignment film 33.

First, after the formation of a black matrix (S11), colored resist layers of three primary colors are formed (S12). Next, a photosetting resin composition corresponding to a material of the leveling layer 37 is applied over the entire surfaces of the resist layers (S13). Then, after the applied photosetting resin composition is partially cured by light (S14), the photosetting resin composition is developed for removing an uncured portion (S15). Subsequently, after a material of the built-in retardation plate 38 is applied over the entire surface of the photosetting resin composition (S16), the applied material of the built-in retardation plate 38 is heated (S17). Thereafter, the material of the built-in retardation plate 38 is entirely irradiated with light to be cured (S18).

Figure 4:
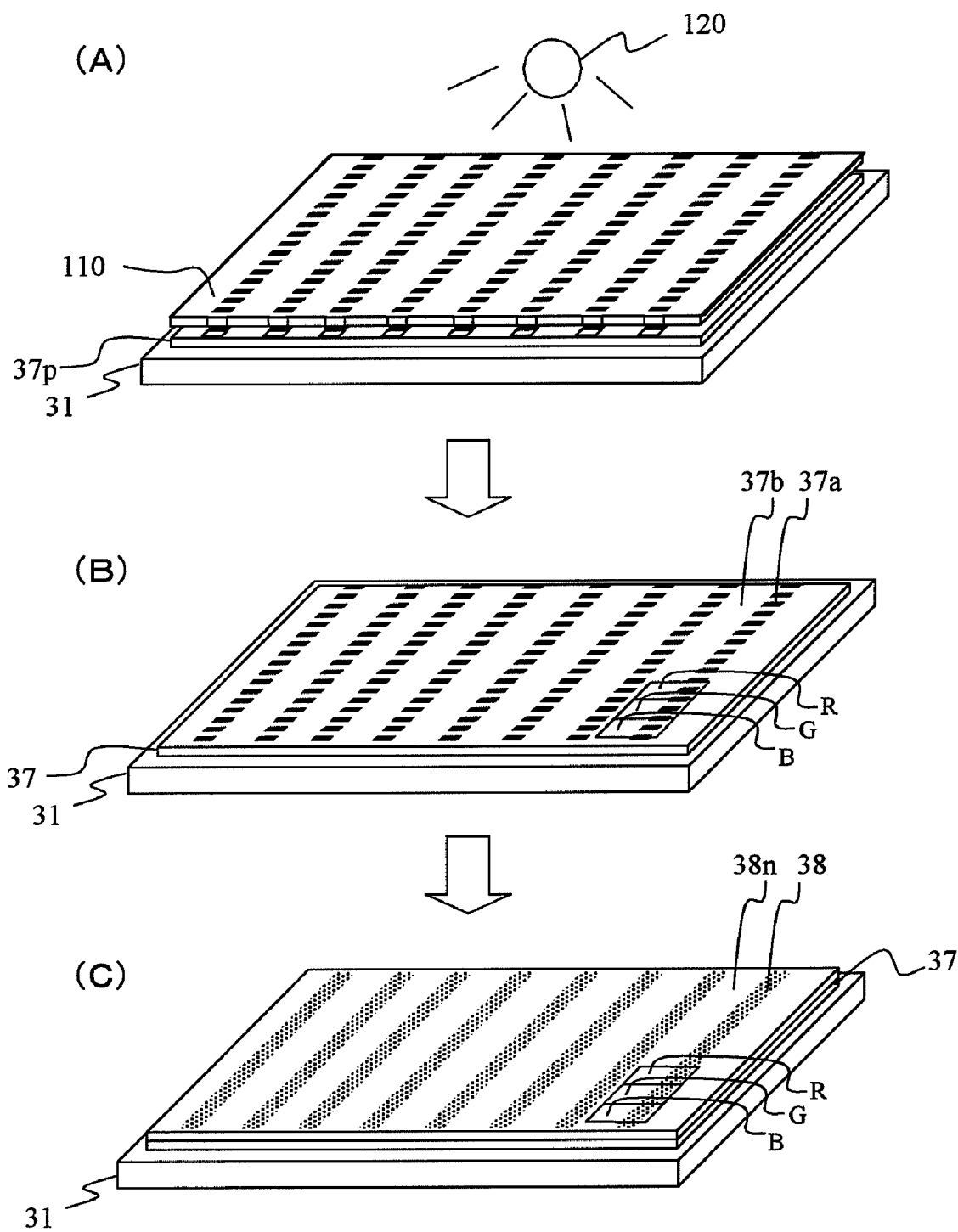
FIG. 4 is a diagram for illustrating a step of forming a leveling layer and a step of forming a built-in retardation plate.

FIG. 4 is a diagram for illustrating the process from a step of forming the leveling layer 37 to a step of forming the built-in retardation plate 38.

First, on the first substrate 31 on which the color filters 36 (not shown in FIG. 4) are formed, a leveling layer material 37p corresponding to the photosetting resin composition is applied. Since the composition (precursor of the leveling layer 37) contains a solvent and the like, a thickness of application is made larger than a thickness after the postbake of the composition described below (thickness of the leveling layer) to obtain a thickness in the range of 1 to 3 μm after the postbake. Then, after prebake, a photomask 110 is provided as illustrated in FIG. 4 (A). Then, the leveling layer material 37p is irradiated with an ultraviolet ray (for example, 1000 mJ/cm²) from a light source 120. Thereafter, the leveling layer material 37p is postbaked at 200° C. for 30 minutes.

The photomask 110 has a plurality of linear mask closures at the positions corresponding to those at which the built-in retardation plates 38 are provided. On the other hand, the photomask 110 does not have any mask closures at the positions corresponding to the transmissive display parts to allow light from the light source 120 to be transmitted therethrough. In FIG. 4, dark parts correspond to the mask closures by which the light is shielded. For easy understanding, however, the mask closures are drawn with a thick line in a relatively enlarged manner as compared with the remaining part in FIG. 4.

By using such a photomask 110, exposed areas and unexposed areas are alternately arranged in a linear manner in each part 37a of the leveling layer material 37p where the built-in retardation plate 38 is to be provided. Specifically, cured areas and uncured areas are alternately arranged in a linear manner.

After the light exposure with the photomask 110, the uncured areas of the leveling layer material 37p are removed by alkali organic development. Then, as illustrated in FIG. 4 (B), the obtained leveling layer 37 has a structure including a plurality of fine slit-like recesses in the reflective display part (the part 37a where the built-in retardation plate 38 is provided). In other words, a plurality of minute grooves are formed. In this embodiment, each recess is formed to have a depth of 1 μm or less. However, the recesses may also be formed as a plurality of slits passing through the leveling layer 37. In this case, each of the slits may expose an underlayer (for example, the color filters 36) of the leveling layer 37. The plurality of minute grooves serve as a base which aligns the molecules in the built-in retardation plate 38.

It is preferred that a width of each slit-like recess be 2 to 5 μm to provide anchoring energy for the built-in retardation plate 38. Moreover, it is preferred that an interval between the slit-like recesses be 2 to 5 μm. It is recommended that a width L of the recess and an interval S between the recesses be appropriately selected to satisfy the relation: L=S or the relation: L+S≦5 μm. Moreover, it is necessary to determine a pattern of the mask closures in the photomask 110 to form the recesses, each having a proper width, at proper intervals. For example, a width of each of the linear mask closures in the photomask 110 is set to 2 μm, and an interval between the mask closures is set to 2 μm.

The material of the leveling layer 37 used in this embodiment will now be described. The material of the leveling layer 37 is not particularly limited as long as the material allows the colored resist layers of the three primary colors constituting the color filters 36 to be sufficiently planarized and allows the formation of the anchoring structure which appropriately aligns the molecules in the built-in retardation plate 38.

Since the material of the leveling layer 37 is partially cured by light as described above in this embodiment, a material that causes a polymerization reaction by light energy such as that of an ultraviolet ray is preferred as the material of the leveling layer 37.

As a material of the leveling layer 37, for example, a composition containing an acrylic resin component, a solvent, a photopolymerization initiator, a thermal-polymerization initiator or the like as a base component, which is cured by UV irradiation and heating, may be cited.

It is preferred that the acrylic resin component contain polyfunctional (meth)acrylates having a polymerizable acrylic group or oligomers thereof, advantageously, at 50% by weight or more of the acrylic resin component. It is also preferred that the polymerizable acrylic resin composition contain trifunctional or higher-functional (meth)acrylates or oligomers thereof, advantageously, at 20% by weight or more of the acrylic resin component.

As a preferred acrylic resin component, polyfunctional (meth) acrylates having a fluorene skeleton or oligomers thereof can be given.

For example, a chemical compound having a cardo structure including a fluorene skeleton, as represented by the following Chemical Formula (I) or (II), may be cited. The use of a resin component having the fluorene skeleton allows the heat resistance of a resin matrix to be enhanced. It is preferred that the acrylic resin component advantageously contain the resin component having the fluorine skeleton at 30% by weight or more of the acrylic resin component. An epoxy acrylate resin of a Novolac resin can also be used in place of the resin component having the fluorine skeleton. The component represented by Chemical Formula (II) can be obtained by a reaction between, for example, an epoxy component represented by Chemical Formula (III) and a (meth) acrylic acid. The component represented by Chemical Formula (I) can be obtained by a reaction between, for example, the component expressed by Chemical Formula (II) and a diabasic acid or tetrabasic acid anhydride. A ratio of the use of the diabasic acid and the tetrabasic acid is in the range of: 0:100 to 100:0.

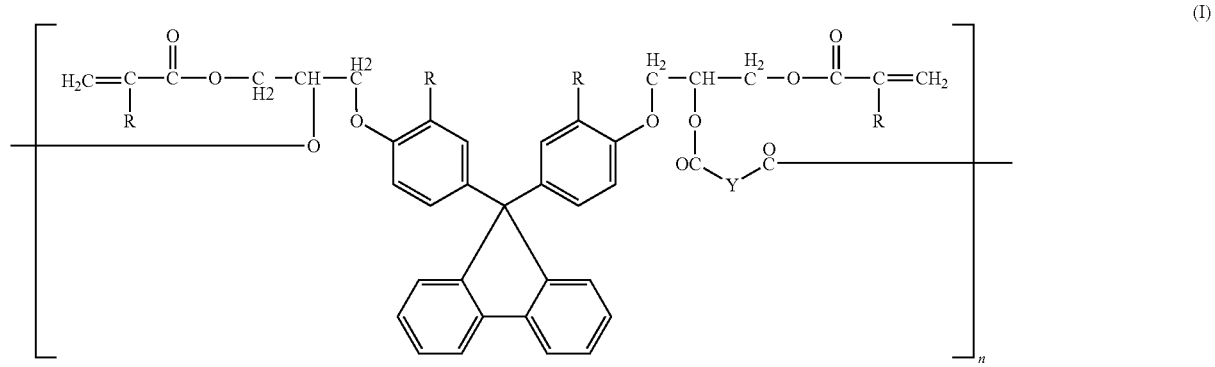

-continued

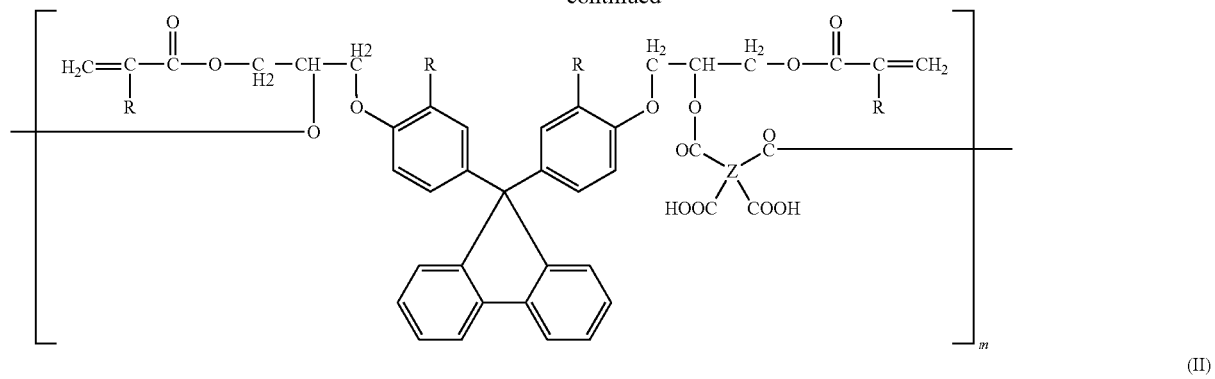

(II)

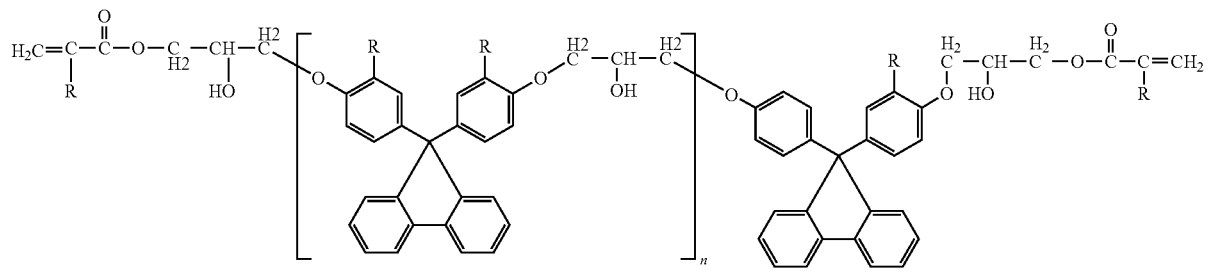

(III)

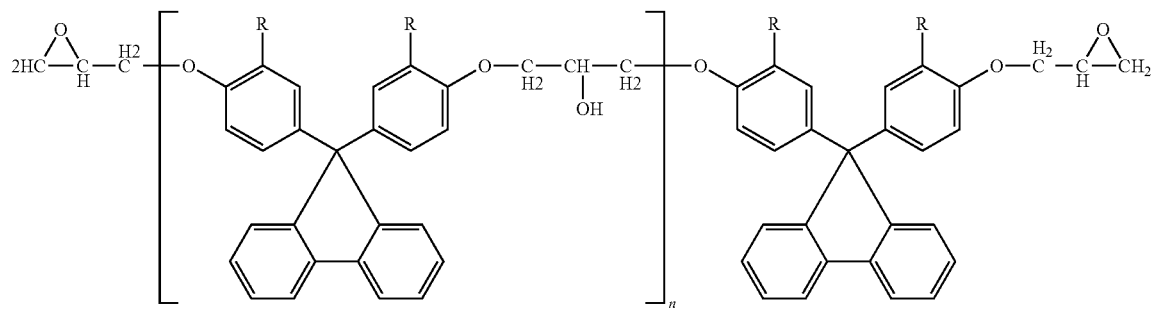

In Chemical Formulae (I) to (III) above, R bonded to a benzene ring represents a hydrogen atom or an alkyl group having a carbon number of 1 to 5, preferably, a hydrogen atom, R bonded to an acrylic group represents a hydrogen atom or a methyl group, n and m represent integers from 0 to 20, and Y and Z represent residues of polybasic acids, respectively. It is preferred that an average value of n (average number of repetitions) be 0 to 1.

Clearly resin components other than the acrylic resin component can be used as long as the resin components do not impair the effects of the leveling layer 37. As the other resin components, resin components such as an epoxy resin, a phenol resin, an olefin resin, a vinyl resin, a polyester resin, or monomers providing those resins, and a curing agent may be cited.

The material of the leveling layer 37 may be a photosetting resin composition containing: (A) an alkali-soluble polymer; (B) 1,2-naphthoquinonediazide sulfonate ester; and (C) an epoxy compound as follows.

Such a photosetting resin composition contains: (A) the alkali-soluble polymer containing, for example, a structural unit (1) represented by Chemical Formula (1):

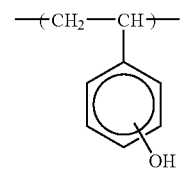

(1)

or the structural unit (1) and a structural unit (2) represented by the following Chemical Formula (2):

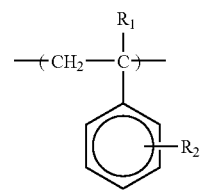

(2)

(where R1 represents a hydrogen atom or an alkyl group having a carbon number of 1 to 5, and R2 is a hydrogen atom, a methyl group or a methoxy group)

in which a polymer containing the structural unit (1) occupied 100 to 70 mol % thereof based on the sum of the structural units (1) and (2);

(B) 1,2-naphthoquinonediazide sulfonate ester selected from the group consisting of a compound represented by the following Chemical Formula (3)

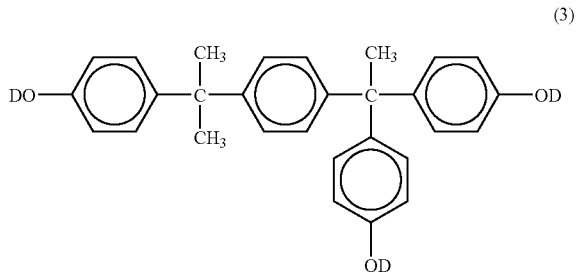

(3)

(where three Ds are the same or different from each other, and represent 1,2-naphthoquinonediazide-4-sulfonyl groups or 1,2-naphthoquinonediazide-5-sulfonyl groups; however, at least one of Ds is a 1,2-naphthoquinonediazide-4-sulfonyl group or a 1,2-naphthoquinonediazide-5-sulfonyl group)

and a compound represented by the following Chemical Formula (4):

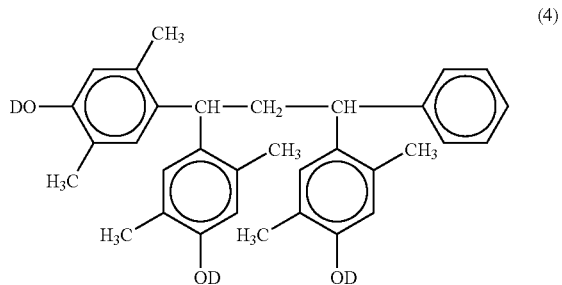

(4)

(where the definition of Ds including the conditional clause is the same as that of the above-described Chemical Formula (3)); and (C) a compound having at least two epoxy groups in a molecule.

Alternatively, as the material of the leveling layer 37, a photosetting resin composition containing: (a) an acrylic polymer having a photopolymerizable unsaturated group; (b) a photopolymerizable unsaturated compound having at least one ethylenic unsaturated group; and (c) a photopolymerization initiator generating a free radical under active ray irradiation may be used.

As (a) the acrylic polymer having a photopolymerizable unsaturated group, its composition and a method of synthesis thereof are not particularly limited. For example, a radical polymerizable copolymer having an ethylenic unsaturated group in a side chain obtained by the additional reaction of a compound having at least one ethylenic unsaturated group and one functional group such as an oxirane ring, an isocyanate group, a hydroxyl group or a carboxyl group with a vinyl copolymer having a functional group such as a carboxyl group, a hydroxyl group, an amino group, an isocyanate group, an oxirane group, or an acid anhydride can be used.

As (b) the photosetting unsaturated compound having at least one ethylenic unsaturated group, for example, a compound obtained by reacting an α,β-unsaturated carboxylic acid with a polyvalent alcohol, a compound obtained by reacting an α,β-unsaturated carboxylic acid with a glycidyl group-containing compound, 2,2-bis(4-(di(meth)acryloxypolyethoxy)phenyl) propane, an urethane monomer, non-ylphenyldioxylene (meth)acrylate, γ-chloro-β-hydroxypropyl-β'-(meth) acryloyl oxyethyl-o-phthalate, β-hydroxyethyl-β'-(meth)acryloyl oxyethyl-o-phthalate, β-hydroxypropyl-β'-(meth)acryloyl oxyethyl-o-phthalate, alkyl ester (meth)acrylate, and the like may be cited. For example, a (meth)acrylic acid means an acrylic acid and a methacrylic acid corresponding thereto, and (meth)acrylate means acrylate and methacrylate corresponding thereto.

As a commercially available material of the leveling layer 37, V-259 PA series manufactured by Nippon Steel Chemical Co., Ltd., OPTMER PC (having positive photosensitivity) manufactured by JSR Corporation, NN series (having negative photosensitivity) manufactured by JSR Corporation, CR-600 manufactured by Hitachi Chemical Co., Ltd., and the like can be used.

Returning to FIG. 3, the description of the built-in retardation plate will be continued.

After the formation of the leveling layer 37, the material of the built-in retardation plate 38 is applied onto the entire surface of the leveling layer 37. Then, the applied material is heated by using a hot plate at 100° C. for 2 to 5 minutes to remove a solvent contained therein. Next, a heating temperature is kept at 80° C. for about 10 minutes to allow the anchoring structure 37a of the leveling layer 37 to align the material (molecules) of the built-in retardation plate 38 in a predetermined direction (S17). The material of the built-in retardation plate 38 is, for example, an organic solvent containing a liquid crystal molecule having a photoreactive acrylic group at the terminal of a molecule and a reaction initiator. The heating temperature in this step (S17) is set to be higher than a melting point of the material of the built-in retardation plate 38 (for example, 70° C.) and lower than a nematic isotropic phase shift temperature (for example, 110° C.) of the material (for example, about 80° C.). The heating time is required to be set long enough to sufficiently align the material (molecules) of the built-in retardation plate 38 (for example, 10 minutes). At this time, the molecules in a part of the material of the built-in retardation plate 38 in contact with the "part 37a of the leveling layer 37, with the anchoring structure" are aligned in a specific orientation direction. As a result, the molecules in the part of the material layer of the built-in retardation plate 38 exhibit a birefringence (phase difference property). On the other hand, the molecules in the remaining part of the material of the built-in retardation plate 38 in contact with a "part 37b of the leveling layer 37, without the anchoring structure" are not aligned. Therefore, the remaining part of the material layer of the built-in retardation plate 38 does not exhibit a birefringence (phase difference property).

Thereafter, the entire surface of the material of the built-in retardation plate 38 is exposed to light to be cured (S18). As a result, as illustrated in FIG. 4 (C), the built-in retardation plates 38 having a phase difference property and the residual layers 38n without a phase difference property are formed.

After the formation of the built-in retardation plates 38, it is recommended that a protection film (insulating film; not shown) be formed over the entire principal surface (the upper surfaces of the built-in retardation plates 38 and the residual layers 38n formed on the principal surface) of the first substrate 31. The protection film is made of, for example, the same material as that of the leveling layer 37 described above or a transparent material which does not contain a photoinitiator. After the formation of the step formation resist layer 39 on the upper surface of each of the residual layers 38n (or the protection film formed thereon) (S19 in FIG. 3), the first alignment film 33 for aligning the molecules in the liquid crystal layer 10 is formed (S20). Alternatively, the leveling layer for planarizing the underlayer may be formed before the formation of the first alignment film 33. Then, the first alignment film 33 is formed on the leveling layer.

The process from the step of forming the color filter 36 to the step of forming the first alignment film 33 on the first substrate 31 has been described above.

The subsequent manufacturing process will be described as follows, referring to FIG. 2.

The first alignment film 33 on the first substrate 31 and the second alignment film 34 on the second substrate 32 are subjected to a rubbing process at 15 degrees with respect to the signal wirings 22. Thereafter, the first substrate 31 and the second substrate 32 are assembled to be opposed to each other. The liquid crystal material is sealed between the first substrate 31 and the second substrate 32 to form the liquid crystal layer 10. Further, a first polarizing plate 41 and a second polarizing plate 42 are placed on the outer surface of the first substrate 31 and that of the second substrate 32, respectively. The first polarizing plate 41 and the second polarizing plate 42 are placed to set their transmission axes to be orthogonal to and parallel to the liquid crystal molecule orientation direction, respectively.

As an adhesive layer of the first polarizing plate 41, a light-diffusing adhesive layer 43 containing a large number of transparent microspheres having a refractive index different from that of an adhesive material is used. The adhesive layer 43 has the effects of enlarging an optical path of incoming light by taking advantage of the effects of refraction generated by a difference in refractive index between the adhesive material and the microspheres at the boundary therebetween. As a result, an iridescent stain caused by the interference of reflected light in the pixel electrode 28 and the common electrode 29 can be reduced.

First Embodiment of the Liquid Crystal Display Device According To the Present Invention The functions of the liquid crystal display device configured as described above will now be described.

As illustrated in FIG. 1, on the principal surface of the second substrate 32 made of a material transparent to a visible ray, such as a glass, the common electrode 29 and the pixel electrode 28 are deposited in this order for each pixel. On the principal surface of the second substrate 32, the scanning wirings 21 and the common wirings 23, both extending in the first direction, are alternately arranged in parallel in the second direction. On an insulating layer 51 covering the scanning wirings 21 and the common wirings 23, a plurality of the signal wirings 22 extending in the second direction are arranged in parallel along the first direction. On the principal surface of the second substrate 32, a plurality of thin film transistors TFT, each corresponding to each of the plurality of pixels, are provided. The thin film transistor TFT surrounded by a broken line in FIGS. 1 and 2 is configured as a field-effect transistor including a semiconductor layer (the above-described amorphous silicon layer) 25 and an electrode (corresponding to a part of the scanning wiring 21). The semiconductor layer 25 is connected to a part of the signal wiring 22 and an input/output electrode 24. The electrode applies an electric field to the semiconductor layer 25 to control a "flow of carriers (electrons or holes) between the part of the signal wiring 22 and the input/output electrode 24". One of: the part of the signal wiring 22 and the input/output electrode 24 is referred to as source electrode, whereas the other is referred to as drain electrode, according to the flow of the carriers in the semiconductor layer 25 interposed therebetween. The above-described part of the scanning wiring 21 which applies an electric field to the semiconductor layer 25 through the insulating layer 51 is also referred to as gate electrode or control electrode, and the insulating layer 51 is also referred to as gate insulating film.

The signal wiring 22 transmits a video image signal to be fetched into the pixel electrode 28 for each predetermined cycle (for example, each frame period or field). A signal (scanning signal) for causing a carrier flow in the semiconductor layer 25 is applied to the scanning wiring 21 for each predetermined cycle described above to feed the video image signal transmitted from the signal wiring 22 through the semiconductor layer 25 and the input/output electrode 24 to the pixel electrode 28. The input/output electrode 24 and the pixel electrode 28 of the thin film transistor TFT are electrically connected to each other through an electrically conductive film formed on an inner wall of a through hole 26. The through hole 26 penetrates through insulating layers 52 and 53 deposited on the input/output electrode 24 to expose the input/output electrode 24. The electrically conductive film may be formed with the formation of the pixel electrode 28. On the other hand, an electric potential of the common wiring 23 is less varied as compared with those of the scanning wiring 21 and the signal wiring 22, and is frequently kept at a reference potential (a constant potential; for example, a ground potential). The common wiring 23 and the common electrode 29 are electrically connected to each other through an electrically conductive film formed on an inner wall of a through hole 27. The through hole 27 penetrates through the insulating layers 51 and 52 deposited on the common wiring 23 to expose a part of the common wiring 23. The electrically conductive film may be formed with the formation of the common electrode 29.

Each of the common electrode 29 and the pixel electrode 28 is made of an electrically conductive material which transmits visible light therethrough (also-called transparent conductive film), such as an indium-tin-oxide (ITO) or an indium-zinc-oxide (IZO).

Each of the pixel electrode 28 and the common electrode 29 has an approximately rectangular profile. As illustrated in the plan view of FIG. 1, an outer periphery of the pixel electrode 28 is surrounded by that of the common electrode 29. An opening (not shown) which avoids electrical short-circuit with the electrically conductive film formed on the inner wall of the through hole 26 is formed in a part of the common electrode 29 to surround the through hole 26.

In each pixel, the common electrode 29 is formed in a single sheet-like shape. On the other hand, the pixel electrode 28 is formed in a comb-teeth shape on the common electrode 29. As the pixel electrode 28 illustrated in FIG. 1, a plurality of openings (linear openings) 30 extending in the first direction (extending direction of the scanning wiring 21) are formed through a rectangular transparent electrically conductive film to be arranged in the second direction (extending direction of the signal wiring 22). The openings 30 separate the transparent electrically conductive film constituting the pixel electrode 28 into a plurality of stripes extending in the first direction. The stripes are arranged in the second direction in a comb-teeth like pattern.

The pixel electrode 28 and the common electrode 29 are electrically separated from each other by the insulating layer 53 for isolating the pixel electrode 28 and the common electrode 29 from each other. An electric flux line generated by a difference in electric potential between the pixel electrode 28 and the common electrode 29 extends from each of the "comb teeth" of the pixel electrode 28 through a gap between the "comb teeth" (the opening 30 in the transparent electrically conductive film) to reach the common electrode 29.

The electric flux line extends from the "comb teeth" of the pixel electrode 28 toward the gap between the "comb teeth" to be approximately parallel to the principal surface of the second substrate 32. The electric flux line approximately parallel to the principal surface of the second substrate 32 passes through the second alignment film 34 formed on the second substrate 32 to penetrate into the liquid crystal layer 10 sealed between the TFT substrate 32 and the color filter substrate 31 to move the liquid crystal molecules in the liquid crystal layer 10.

The polarizing plates (films) 42 and 41 are provided on the outer surface (principal surface opposite to the liquid crystal layer) of the TFT substrate 32 and that of the color filter substrate 31, respectively.

With no application of an electric field, the optical axes of the liquid crystal molecules in the liquid crystal layer 10 are set in a direction to be offset from (for example, orthogonal to) those of the polarizing plates 41 and 42. The first alignment film 33 and the second alignment film 34 set the liquid crystal molecules in such a direction. The optical axis herein denotes a direction in which the liquid crystal molecules or the polarizing plates 41 and 42 exhibit, for example, a high refractive index, with respect to light transmitting therethrough.

On the other hand, as the above-described electric field formed approximately parallel to the principal surface of the second substrate 32 from the "comb teeth" of the pixel electrode 28 toward the common electrode 29 gets stronger, the direction of the optical axis of each of the liquid crystal molecules gradually gets closer to those of the optical axes of the polarizing plates 41 and 42. Specifically, as the electric field formed in the second substrate 32 (in-plane) gets stronger, the amount of light transmitted through the liquid crystal layer 10 becomes larger. This is because the type of the illustrated pixel configuration is referred to as in-plane switching, abbreviated as IPS.

The electric potential of the pixel electrode 28 varies according to an output (image information) from the thin film transistor, while the electric potential of the common electrode 29 is determined according to a so-called reference voltage applied from the common wiring 23. Specifically, even when the potentials of the pixel electrodes differ from each other in the group of pixels, each including the common electrode 29 connected to the single common wiring 23, a common potential of each of the pixels is approximately the same.

It is recommended that the common wiring 23 be made of a metal such as aluminum or tantalum to be more likely to reflect incident light as compared with the pixel electrode or the common electrode. The illustrated common wiring 23 extends through the through hole 27, through which the common electrode 29 is in contact with the common wiring 23, into the pixel. Therefore, the extending part of the common wiring 23 is provided below the pixel electrode 28 and the common electrode 29 to reflect light, which has passed from the color filter 31 through the liquid crystal layer 10, the pixel electrode 28, and the common electrode 29 to be incident on the extending part (its upper surface), toward the color filter substrate 31. The structure including such an area formed for each pixel is a characteristic of the transflective liquid crystal display device.

One embodiment of the present invention has been described above.

According to the above-described embodiment, in the manufacturing process, of the leveling layer formed by applying the material over the entire surfaces of the transmissive display part and the reflective display part, only the reflective display part is provided with anchoring energy by a contrivance in photosetting. Of the material of the built-in retardation plate 38 applied over the entire surfaces of those display parts, only the molecules of the area corresponding to the reflective display part is aligned and made to keep the phase different property. Specifically, the application step of the alignment film, which aligns the molecules in the built-in retardation plate 38, and the rubbing step accompanying the application step can be omitted. Thus, by the reduction of the number of steps in the process, reduction in time required for manufacturing and in material cost can be achieved.

Moreover, since a peel-off material is conventionally generated by a rubbing cloth or the alignment film during the rubbing process, a cleaning step has to be added after the rubbing process. Further, even if cleaning is carried out, the foreign material cannot be prevented from being flowed into the subsequent steps to lower a yield. On the other hand, in the manufacturing process according to this embodiment, the alignment film rubbing step which aligns the molecules in the built-in retardation plate 38 is omitted, so no foreign material is generated after the rubbing to eliminate the possibility of lowering the yield.

Further, in the liquid crystal display device according to this embodiment, the absence of the alignment film which aligns the molecules in the built-in retardation plate 38 improves the transmittances of the transmissive display part and the reflective display part.

The present invention is not limited to the above-described embodiment. Various variations of the embodiment are possible.

Figure 6A:
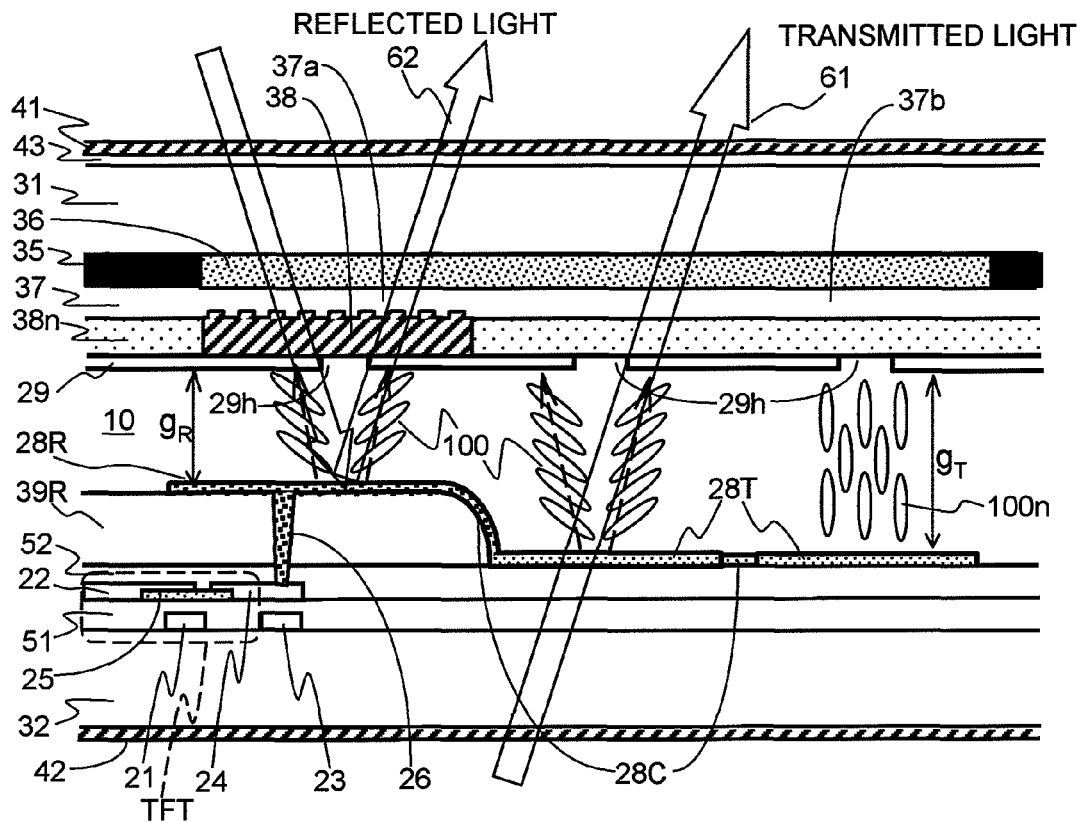
FIGS. 6A and 6B are a sectional view and a top view of one pixel in another liquid crystal display device, respectively.
Figure 6B:
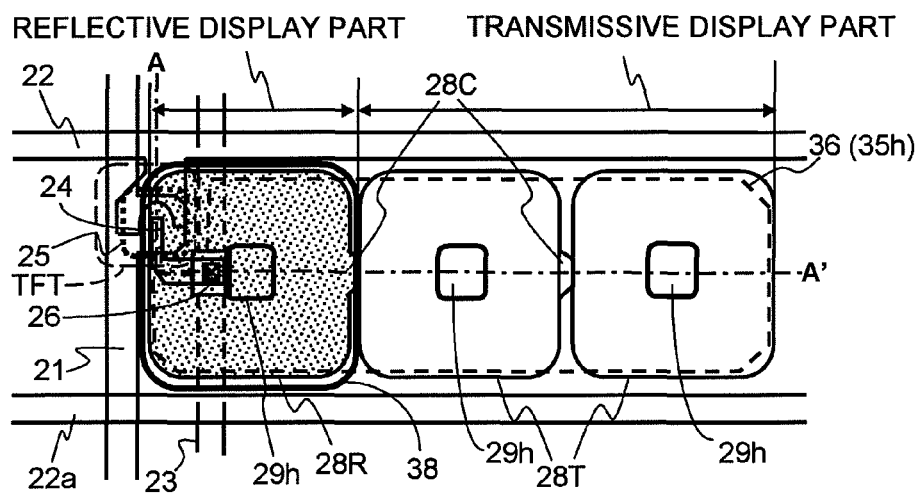

Second Embodiment of the Liquid Crystal Display Device According To the Present Invention As a variation of the first embodiment of the liquid crystal display device described above, a VA transflective liquid crystal display device according to the present invention will be described referring to FIG. 6. FIG. 6A illustrates a sectional configuration of one of pixels formed in the VA transflective liquid crystal display device, and FIG. 6B illustrates a planar configuration of the single pixel. FIG. 6A is depicted as a cross section of the liquid crystal display device (one pixel thereof) cut along a line A-A' in FIG. 6B. Among the constituent elements illustrated in FIGS. 6A and 6B, those which have the equivalents illustrated in FIG. 1 or 2 are denoted by the same reference numerals as those of the equivalents illustrated in FIG. 1 or 2 to avoid the repetition of the same description. One pixel may be defined as an area surrounded by an opening 35h through a black matrix (light-shielding film) 35 or as an area surrounded by a profile (outer circumference) of the color filter (colored resists) 36. In FIG. 6B, a signal wiring 22a is formed in the same manner as the signal wiring 22 except that the signal wiring 22a is not connected to the thin film transistor TFT of the illustrated pixel. In FIG. 6B, a part of the signal wiring 22 and the input/output electrode 24 are formed to be opposed to each other on the semiconductor layer 25 whose profile is indicated by a dotted frame. A part of the signal wiring 22 is curved in a U-like shape to surround the input/output electrode 24.

First, differences between the VA transflective liquid crystal display device and the IPS transflective liquid crystal display device will be described. In the VA liquid crystal display device, the common electrode 29 is formed on the first substrate 31. In each of the reflective display part and the transmissive display part provided for each pixel, an opening 29h is provided through the common electrode 29. The opening 29h is formed as a slit or a notch according to the shape of the pixel electrode 28. FIG. 6A illustrates liquid crystal molecules 100 to which an electric field between the pixel electrode 28 and the common electrode 29 is applied and liquid crystal molecules 100n to which the electric field is not applied (in other words, in an initial orientation state). Each of the liquid crystal molecules 100 and 100n is illustrated as a prolate ellipsoid. The electric field generated between the pixel electrode 28 and the common electrode 29 is indicated by a dashed arrow. The electric field generated between the pixel electrode 28 and the common electrode 29, which are opposed to each other through the liquid crystal layer 10 therebetween, is tilted at a predetermined angle with respect to a direction separating the first substrate 31 and the second substrate 32 from each other (hereinafter, referred to as cell gaps; $g_R$ and $g_T$ in FIG. 6A) by the openings 29h provided through the common electrode 29. When no electric field is generated between the pixel electrode 28 and the common electrode 29, the liquid crystal molecules 100n having a uniaxial birefringence are initially oriented to align the molecular axes (longitudinal axes of the "prolate ellipsoids" described above) of the liquid crystal molecules 100n along the cell gaps. Such initial orientation of the liquid crystal molecules 100n is referred to as "vertical alignment (VA)". The liquid crystal layer 10, in which the liquid crystal molecules 100n are initially oriented, shields light incident thereon. The molecular axes of the vertically aligned liquid crystal molecules 100n are tilted with respect to the cell gaps according to the intensity of the electric field between the pixel electrode 28 and the common electrode 29 as the molecular axes of the liquid crystal molecules 100. According to the tilt, the amount of light transmitted through the liquid crystal layer 10 increases.

It is not necessary to form a slit, a notch or an opening in the pixel electrode 28 as provided in the common electrode 29. The pixel electrode 28 according to this embodiment is divided into one reflective pixel electrode 28R and two transmissive pixel electrodes 28T for the respective openings 29h provided in the common electrode 29. The input/output electrode 24 of the thin film transistor TFT is electrically connected to the reflective pixel electrode 28R through the through hole 26. Further, the reflective pixel electrode 28R and the transmissive pixel electrode 28T are electrically connected to each other, and the transmissive pixel electrodes 28T are electrically connected to each other, through connecting portions 28C, respectively. As the reflective pixel electrode 28R, a film made of a metal such as aluminum, titanium, or tantalum, or an alloy containing aluminum, titanium, tantalum, or the like is used. As each of the transmissive pixel electrodes 28T, a transparent electrically conductive oxide such as an indium-tin-oxide (ITO), an indium-zinc-oxide (IZO), an antimony-doped tin oxide (ATO), or an aluminum-doped zinc oxide (AZO) is used.

As in the case of the first embodiment described above, the thin film transistor TFT has a so-called inversely-staggered structure including the semiconductor layer 25 for connecting the signal wiring 22 and the input/output electrode 24 to each other above the part (control electrode) of the scanning wiring 21 through the insulating layer 51 therebetween. Alternatively, as a structure of the thin film transistor TFT, after the semiconductor layer 25 is covered with the insulating layer 51, the control electrode 21 may be provided on the insulating layer 51. The semiconductor layer 25 may be formed of any of amorphous silicon, polycrystalline silicon, and continuous grain silicon formed by arranging a plurality of crystalline grains (band-like single crystal grains), which extend from a bonded portion with the signal wiring 22 toward a bonded portion with the input/output electrode 24, in parallel. As a semiconductor material, elements or molecules other than silicon can be used.

On an upper surface of the uppermost layer (the signal wiring 22 and the input/output electrode 24 in FIG. 6) of the thin film transistor TFT, the insulating layer 52, a step formation resist layer (insulating layer) 39R, and the reflective pixel electrode 28R are deposited in this order. The step formation resist layer 39R differs from that in the first embodiment in that the step formation resist layer 39R is provided on the second substrate 32 (TFT substrate). The step formation resist layer 39R is formed at the same position as that of the insulating layer 53 in the first embodiment to have a thickness larger than a twice thickness of the sum of the insulating layers 51 and 52. Specifically, the thickness of the step formation resist layer 39R is adjusted so that the gap $g_R$ between the uppermost surface (upper surface of the common electrode 29 in FIG. 6) of the first substrate 31 and the uppermost surface (upper surface of the reflective pixel electrode 28R in FIG. 6) of the second substrate 32 in the reflective display part is smaller than the gap $g_T$ between the uppermost surface (upper surface of the common electrode 29 in FIG. 6) of the first substrate 31 and the uppermost surface (upper surfaces of the transmissive pixel electrodes 28T in FIG. 6) of the second substrate 32 in the transmissive display part, desirably, is approximately ½ of the gap $g_R$. For the formation of the step formation resist layer 39R by photolithography or the like, a wave-like pattern (for example, a corrugated pattern) may be formed on the upper surface of the step formation resist layer 39R to form the pattern on the upper surface of the reflective pixel electrode 28R. Light reflected by the reflective pixel electrode 28R is moderately diffused by the wave-like pattern formed on its upper surface in the pixel including the reflective pixel electrode 28R.

The first substrate 31 is made of a material which transmits light in a visible region (wavelength band of 380 to 780 nm) such as a glass or a plastic (hereinafter, referred to as transparent material). On the principal surface of the first substrate 31, the plurality of color filters (colored resists) 36 and the light-shielding film 35 which separates a pair of the adjacent color filters 36 from each other are formed. Even in the liquid crystal display device illustrated in FIG. 2 according to the first embodiment, the light-shielding film 35 is formed between the color filters 36. The color filters 36 are formed of a resin material (for example, an organic material such as a resist material) containing, for example, at least one of a pigment, a dye, and a fluorescent material. The light-shielding film 35 is formed as an inorganic film made of a metal such as chromium (Cr) or an alloy, or a thin resin film (thin organic film) containing the dispersion of particles having a high light absorbance such as carbon, a cobalt oxide, or a black pigment. Since the light-shielding film 35 has a lower light transmittance in the visible region than that of the color filters 36, the light-shielding film 35 is also described as being opaque.

Even in the second embodiment, the leveling layer 37 which planarizes the undulation generated on the principal surface of the first substrate 31 by the color filters 36 and the light-shielding film 35 provided therebetween is formed. Further, as in the first embodiment, the part (37a) of the leveling layer 37 is provided with "anchoring energy" which aligns molecules of the material (precursor) of the built-in retardation plate 38 provided on the upper surface of the leveling layer 37 in a desired direction. Therefore, the built-in retardation plate 38 (organic film formed of aligned molecules) is formed on the upper surface of the part 37a of the leveling layer 37, which is provided with the anchoring energy, whereas the residual layer 38n (organic film formed of non-aligned molecules) of the built-in retardation plate 38 is formed on the upper surface of the part 37b of the leveling layer 37, which is not provided with the anchoring energy. The undulation on the upper surfaces of the built-in retardation plate 38 and the residual layer 38n thereof is prevented by the leveling layer 37 serving as the underlayer thereof. On the upper surfaces of the built-in retardation plate 38 and the residual layer 38n, the common electrode 29 having the openings 29h is formed. Through an electron microscopical observation of the geometry, the built-in retardation plate 38 and the residual layer 38n thereof are observed as being formed as a single thin organic film, and therefore are recognized as having the same composition. However, since the residual layer 38n does not exhibit the "birefringence (phase difference property)" which is exhibited by the built-in retardation plate 38, the discrimination between the built-in retardation plate 38 and the residual layer 38n can be ensured. As illustrated in FIG. 6B, the built-in retardation plate 38 (indicated in a thick line frame) is distributed as a plurality of islands, each being opposed to the reflective pixel electrode 28R, in the residual layer 38n, in the principal surface of the first substrate 31.

Alternatively, the built-in retardation plate 38 and the residual layer 38n thereof can also be formed above the common electrode 29 having the openings 29h through the leveling layer 37. Further alternatively, an alignment film (not shown) which aligns the liquid crystal molecules 100 and 100n in the liquid crystal layer 10 may be formed on at least one of the uppermost layer (the common electrode 29 in FIG. 6) of the first substrate 31 and the uppermost layer (the pixel electrodes 28R and 28T in FIG. 6) of the second substrate 32.

Material Suitable for Forming the Built-In Retardation Plate

For example, in the step of forming the built-in retardation plate 38, the appropriate selection of a material which forms the built-in retardation plate 38, a wavelength of light irradiated thereto, and a photopolymerization initiator added thereto can prevent the built-in retardation plate 38 and the residual layer 38n from being stained.

Figure 5:
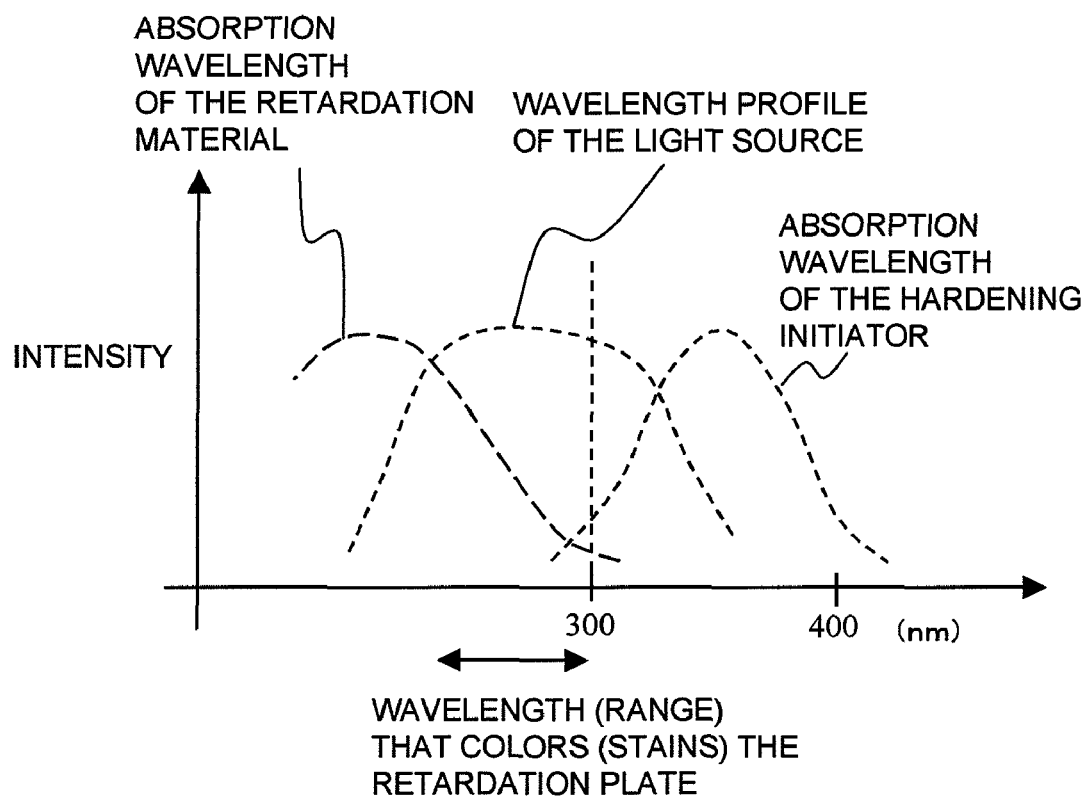
FIG. 5 is a graph showing the relation between a wavelength of a light source, an absorption wavelength of a polymerization initiator, and a wavelength that stains the retardation plate.

FIG. 5 is a graph for illustrating a wavelength that stains the liquid crystal material which forms the built-in retardation plate 38. Some liquid crystal materials for forming the built-in retardation plate 38 are stained when the liquid crystal materials absorb light having a wavelength of less than 300 nm. Therefore, it is preferable that the light having a wavelength of less than 300 nm be not radiated.

Therefore, the use of a lamp capable of radiating light having a specific wavelength is recommended. For example, a lamp having a higher intensity for light having a wavelength of 300 nm or more while having a lower intensity for light having a wavelength of less than 300 nm is used.

Alternatively, a filter for shielding light having a wavelength of less than 300 nm may be used. For example, a short-wavelength cut UV filter for shielding short-wavelength light is used. Moreover, the use of a filter for rejecting all the absorption wavelengths of the liquid crystal material which forms the built-in retardation plate 38 is preferred. For example, a Teijin (registered trademark) Tetoron® Film G2 manufactured by Teijin Dupont Films Japan Limited can be used.

Because light having a wavelength of 300 nm or more is radiated, the material of the built-in retardation plate 38 is required to be cured by the radiation of light having a wavelength of 300 nm or more. Accordingly, it is preferred to select the photopolymerization initiator which absorbs light having a wavelength of 300 to 400 nm. Preferably, an initiator has an absorbance index of 1000 ml/gcm or higher at 365 nm and 100 ml/gcm or higher at 405 nm in the material (solvent contained therein or methanol serving as a solvent of the photopolymerization initiator) of the built-in retardation plate 38.

As a material which forms the built-in retardation plate 38, a liquid crystal monomer having a photoreactive acrylic group at the terminal of a molecule as represented by the following Chemical Formulae can be used.

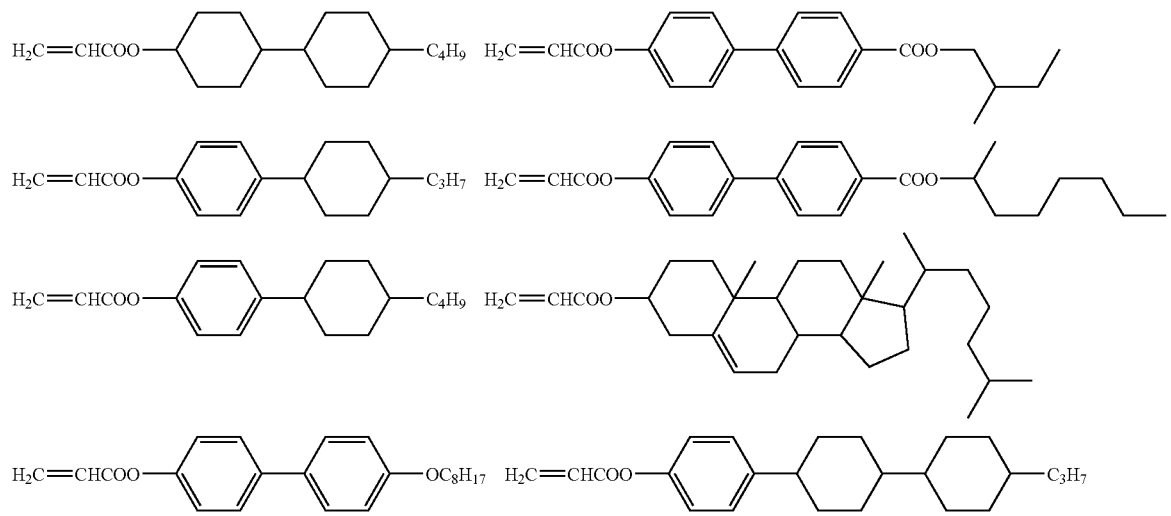

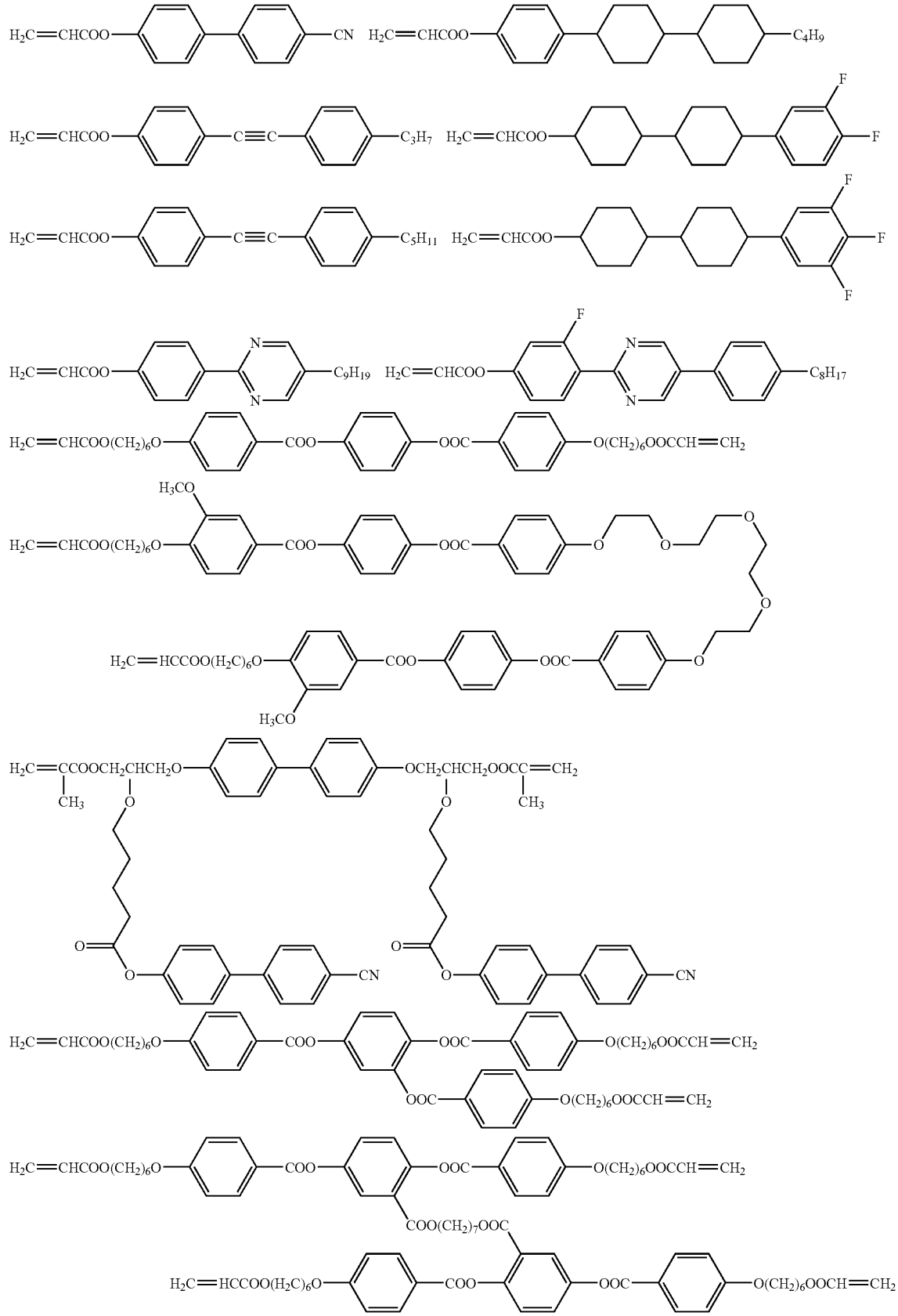

It is preferred that the photopolymerization initiator be non-volatile in view of heating and light exposure. For example, IRUGACURE® 907, IRUGACURE 369, IRUGACURE 819, IRUGACURE 127, DAROCUR® TPO, IRUGACURE OXE01 or the like manufactured by Ciba Specialty Chemicals can be selected. In particular, because IRUGACURE 819 can prevent stain and has a low volatility, a small amount of light is sufficient for exposure.

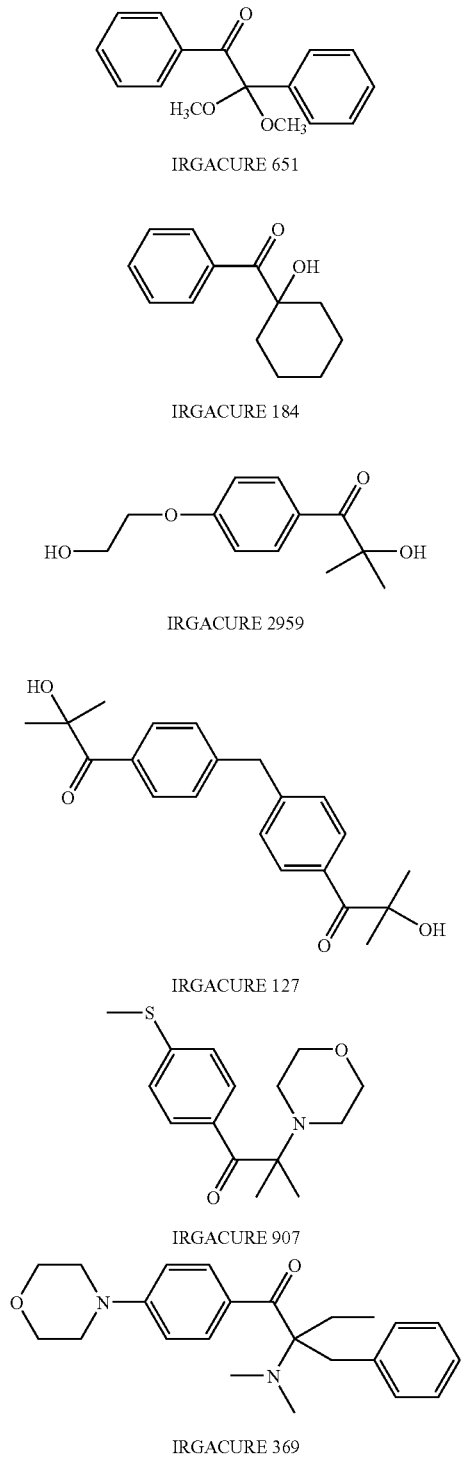

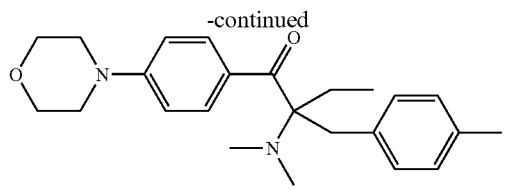

IRGACURE 379

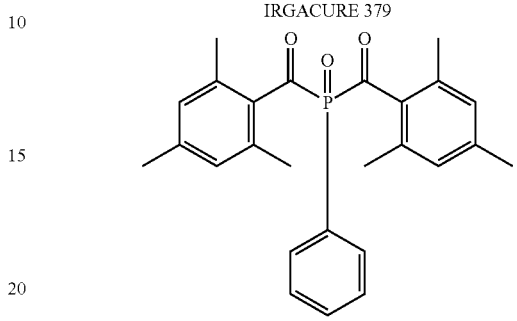

IRGACURE 819

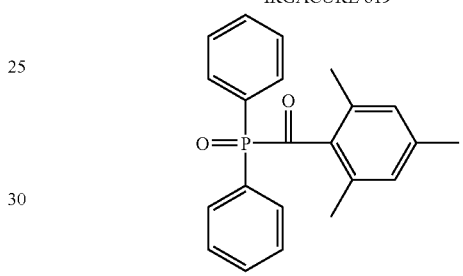

DAROCUR TPO

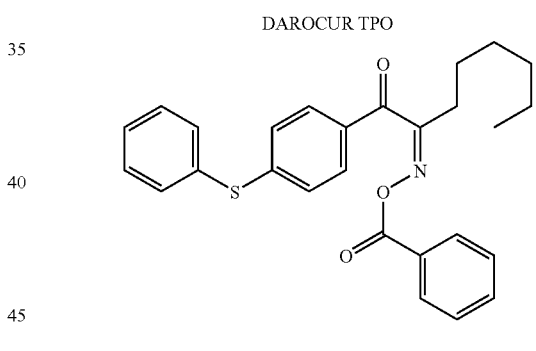

IRGACURE OXE01

As described above, by appropriately selecting the material of the built-in retardation plate 38, the wavelength of light to be radiated, and the photopolymerization initiator, the transmittances of the built-in retardation plate 38 and the residual layer 38n can be made to be 90% or more with respect to visible light (for example, light having a wavelength in the range of 400 to 800 nm). As a result, the built-in retardation plate 38 and the residual layer 38n can be prevented from being stained. Specifically, when the built-in retardation plate 38 and the residual layer 38n can transmit 90% or more of light in a visible light region (for example, in a wavelength band of 400 to 800 nm) which is incident thereon, a display luminance of the liquid crystal display device can be kept sufficiently high.

While we have shown and described several embodiments according to the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A method of manufacturing a transflective liquid crystal display device including a liquid crystal layer sealed between a principal surface of a first substrate, in which a retardation plate is built, and a second substrate, comprising:
    a first step of applying a photosetting resin composition serving as an underlayer of the retardation plate, onto the principal surface of the first substrate;
    a second step of selectively forming unevenness on a part of the applied photosetting resin composition, in which the retardation plate is provided, by a partial curing process of an applied film of the photosetting resin composition by exposure to light through a mask, and a development process which removes an uncured portion of the applied film remaining after the partial curing process; and
    a third step of applying material of the retardation plate onto the cured applied film of the photosetting resin composition to form the retardation plate by anchoring energy of the part of the cured applied film on which the unevenness is formed.

2. A method of manufacturing a transflective liquid crystal display device including a color filter substrate including color filters corresponding to a plurality of pixels, which are formed on a principal surface thereof, each of the color filters corresponding to the plurality of pixels, including a reflective display part and a transmissive display part, the reflective display part of the color filter substrate including a retardation plate built therein, the method comprising in the following order:
    a leveling layer application step of applying a photosetting resin composition on upper surfaces of colored resist layers formed as the color filters, respectively, on the principal surface of the color filter substrate, as a leveling layer of the colored resist layers;
    a leveling layer curing step of partially exposing the photosetting resin composition to light, to cure the photosetting resin composition;
    a development step of removing an uncured portion of the photosetting resin composition;
    a step of applying a material of the retardation plate onto a layer made of the photosetting resin composition;
    a heating step of heating the applied material of the retardation plate; and
    a retardation plate curing step of exposing the material of the retardation plate to light, to cure the material of the retardation plate,
    wherein the leveling layer curing step comprises performing light exposure through a mask to alternately arrange exposed parts and unexposed parts in an area of the photosetting resin composition where the retardation plate is provided.

3. A method of manufacturing the transflective liquid crystal display device according to claim 2, wherein the heating step comprises heating the material of the retardation plate at a temperature higher than a melting point of the material of the retardation plate and lower than a nematic isotropic phase shift temperature.

4. A transflective IPS liquid crystal display device comprising:
    a first substrate including color filters formed on a principal surface thereof;
    a second substrate opposed to the principal surface of the first substrate, the second substrate being bonded to the first substrate; and
    a liquid crystal layer sealed between the first substrate and the second substrate, each of areas of the color filters, corresponding to each pixel, including a reflective display part and a transmissive display part;
    wherein the color filters, a first resin layer, and a second resin layer are formed in this order on the principal surface of the first substrate;
    wherein the second resin layer is in contact with the first resin layer, and each of the first resin layer and the second resin layer extends from the reflective display part to the transmission display part for each of the areas corresponding to each pixel;
    wherein the second resin layer has a phase difference property in the reflective display part, the phase difference property of the second resin layer being obtained by curing a liquid crystal material having a birefringence; and
    wherein a structure which aligns liquid crystal molecules which form the second resin layer, is formed in a part of the first resin layer in contact with the part of the second resin layer which has the phase difference property.

* * * * *